United States Patent [19]

Iwanami et al.

[11] 4,349,644

[45] Sep. 14, 1982

[54] MELT-BLENDED RESIN COMPOSITION OF HYDROLYZED ETHYLENE/VINYL ACETATE COPOLYMERS

[75] Inventors: Teruo Iwanami, Ibaraki; Hiroshi Takida, Takatsuki; Yukio Fujita, Otsu, all of Japan

[73] Assignee: Nippon Gohsei Kagaku Kogyo Kabushiki Kaisha, Osaka, Japan

[21] Appl. No.: 250,411

[22] Filed: Apr. 2, 1981

[51] Int. Cl.$^3$ .................. C08L 23/26; C08L 29/02
[52] U.S. Cl. .................................. 525/57; 428/500; 428/515; 525/60
[58] Field of Search ................................. 525/57, 60

[56] References Cited

U.S. PATENT DOCUMENTS 3,975,463  8/1976  Hirata et al. .................... 525/57
4,228,250 10/1980  Pritchett ......................... 525/57

FOREIGN PATENT DOCUMENTS 55-110132  8/1980  Japan .

Primary Examiner—Carman J. Seccuro
Attorney, Agent, or Firm—Armstrong, Nikaido, Marmelstein & Kubovcik

[57] ABSTRACT

A melt-blended composition containing at least two kinds of hydrolyzed ethylene-vinyl acetate copolymers having a different ethylene content from each other within the range of 20 to 55% by mole, a degree of hydrolysis in vinyl acetate component of at least 80% by mole and a specific melt tension as defined herein, the hydrolyzed copolymers included in the largest amount and the second largest amount among the hydrolyzed copolymers constituting the composition having a specific relationship with each other in weight ratio and ethylene content and the fusion curve of the composition indicating substantially single peak. The composition has an improved melt-moldability, and provides molded articles having remarkably reduced fish eyes and uniform thickness or excellent dimensional stability.

1 Claim, 2 Drawing Figures

MELT-BLENDED RESIN COMPOSITION OF HYDROLYZED ETHYLENE/VINYL ACETATE COPOLYMERS

BACKGROUND OF THE INVENTION

The present invention relates to a composition containing at least two kinds of hydrolyzed ethylene-vinyl acetate copolymers, and more particularly to a melt-blended resin composition having an improved melt-molding property.

A hydrolyzed ethylene-vinyl acetate copolymer having an ethylene content of 20 to 55% by mole and a degree of hydrolysis in vinyl acetate component of not less than 80% by mole has good properties such as oxygen impermeability, oil resistance, solvent resistance, antistatic property, perfume retaining property and mechanical characteristics. Therefore, the melt-molded articles of the hydrolyzed copolymer are used for various uses, including films, sheets and vessels for wrapping or packaging foods, electric and electronic device parts and machine parts.

However, the hydrolyzed ethylene-vinyl acetate copolymer has a defect of being hard to melt-mold due to its molecular structure as compared with common thermoplastic resins such as polyolefins and polystyrene. Therefore, in case of extrusion molding of the copolymer into a film, sheet or vessel, the uniformity in thickness is not always sufficient and also it tends to produce many fish eyes. Also, in case of injection molding of the copolymer, the injection pressure is not stabilized, whereby the mold shrinkage varies and no molded articles having a constant size are obtained.

It is an object of the present invention to provide a composition of hydrolyzed ethylene-vinyl acetate copolymers having an improved melt-moldability.

A further object of the invention is to provide a composition capable of being molded into articles having remarkably reduced fish eyes, a uniform thickness or an excellent dimensional stability.

These and other objects of the present invention will become apparent from the description hereinafter.

SUMMARY OF THE INVENTION

It has now been found that the abovementioned defect of a hydrolyzed ethylene-vinyl acetate copolymer can be completely eliminated and the objects of the present invention can be attained, when there is employed a composition obtained by melt-blending at least two kinds of hydrolyzed ethylene-vinyl acetate copolymers having a specific composition and property in a specific proportion.

In accordance with the present invention, there is provided a melt-blended resin composition comprising a mixture of at least two kinds of hydrolyzed ethylene-vinyl acetate copolymers having different ethylene contents, each of the hydrolyzed ethylene-vinyl acetate copolymers having an ethylene content of 20 to 55% by mole, a degree of hydrolysis in vinyl acetate component of at least 80% by mole and a melt tension of at least 0.1 g., the fusion curve of the mixture measured by a Differential Scanning Calorimeter indicating substantially single peak, and the hydrolyzed ethylene-vinyl acetate copolymer $A_1$ included in the largest amount and the hydrolyzed ethylene-vinyl acetate copolymer $A_2$ included in the second largest amount among the hydrolyzed copolymers constituting the composition having the correlation between them that the proportion of the hydrolyzed copolymer $A_1$ to the hydrolyzed copolymer $A_2$ falls within the range of 95:5 to 50:50 by weight and a difference in ethylene content between the hydrolyzed copolymer $A_1$ and the hydrolyzed copolymer $A_2$ is at least 3% by mole.

DETAILED DESCRIPTION

In the present invention, it is necessary that all of the above-mentioned conditions are satisfied, and lack of even one condition cannot provide desired effects.

(1) Since the surging phenomenon is decreased in extrusion molding, molded articles having a uniform thickness are produced and few fish eyes can be found in the molded articles.

(2) In injection molding, the injection pressure is stabilized and the mold shrinkage becomes constant.

Two or more kinds of hydrolyzed ethylene-vinyl acetate copolymers are used in the present invention. It is necessary that each of the hydrolyzed copolymers used has (1) an ethylene content within the range of 20 to 55% by mole, (2) a degree of hydrolysis in the vinyl acetate component of not less than 80% by mole, and (3) a melt tension as defined below of not less than 0.1 g.

If the ethylene content is too low, thermal degradation of the hydrolyzed copolymers takes place in melt-molding to cause troubles such as coloration and occurrence of many fish eyes. If the ethylene content is too high, properties such as oxygen impermeability, oil and solvent resistances, antistatic property and perfume retaining property are impaired. These properties are also impaired when the degree of hydrolysis in vinyl acetate component is low. The melt tension is also an important condition. Even if the ethylene content and the degree of hydrolysis of the hydrolyzed copolymers fall within the above ranges, the hydrolyzed copolymer having a melt tension less than 0.1 g. is hard to provide molded articles having a uniform thickness and no fish eye or having an excellent dimensional stability, since the pressure of resin in a barrel does not raise and also the mixing effect is lowered.

The terms "ethylene content" and "degree of hydrolysis" as used herein indicate average ethylene content and average degree of hydrolysis as used in an ordinary meaning.

Figure 1:
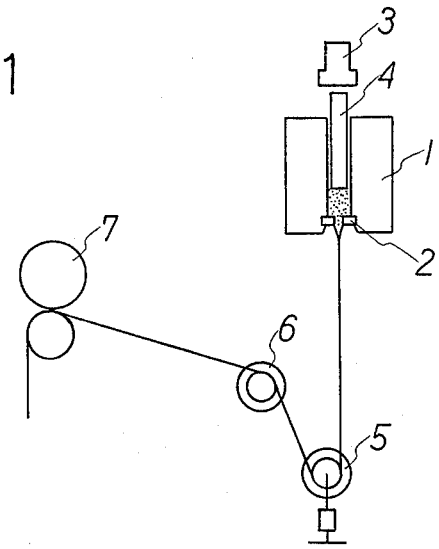
FIG. 1 is an illustrative view showing the method of measuring the melt tension as defined herein.

The melt tension as shown herein is measured by a method shown in FIG. 1 at a temperature higher than a melting point of the hydrolyzed copolymer by 20° C. FIG. 1 is an illustrative view showing the method of measuring the melt tension. Numeral 1 is a heating cylinder in accordance with ASTM D 1258, and a sample polymer is packed in the cylinder 1 and is heated for a prescribed period of time. A load is applied to a load cell 3 so that a piston 4 goes down, whereby a molten mass of the sample copolymer is extruded from an orifice 2 having a diameter of 2 mm. and a length of 8 mm. The melt tension is measured by drawing the extrudate by a roll 7 through a pulley 5 equipped with a strain gauge and a pulley 6. The measurement is carried out under the following conditions.
Heating time: 5 minutes at a prescribed temperature
Extrusion rate: 0.373 cc./min.
Air gap (distance from the orifice 2 to the pulley 5): 25 cm.
Drawing rate: 500 cm./min.
Atmosphere temperature: 20° C.
Full scale
  Load cell: 10 kg.
  Strain gauge: 5 g.

In the present invention, it is also essential that the fusion curve of the melt-blended mixture of at least two kinds of the hydrolyzed copolymers measured by a Differential Scanning Calorimeter shows substantially a single peak. When two or more kinds of hydrolyzed ethylene-vinyl acetate copolymers included in the composition are different too much in ethylene content, degree of hydrolysis or degree of polymerization, or when the composition is not blended intimately, the fusion curve indicates two or more independent peaks. In such a case, the resin pressure at the compression zone and the metering zone in a barrel of an extruder becomes low and thus the blending becomes insufficient. For this reason, in extrusion molding, the film thickness does not become uniform and fish eye is not reduced, or in injection molding, no molded articles having an excellent dimensional stability are obtained. The term "fusion curve" as used herein indicates a fusion curve obtained in the first measurement and has no connection with the crystallization curve and the refusion curve.

Furthermore, it is necessary to satisfy the following two conditions, i.e. (1) the ratio of the hydrolyzed copolymer $A_1$, which is the copolymer used in the largest amount among hydrolyzed ethylene-vinyl acetate copolymers constituting the composition of the present invention, to the hydrolyzed copolymer $A_2$, which is the copolymer used in the second largest amount among hydrolyzed ethylene-vinyl acetate copolymers constituting the composition of the present invention, being within the range of 95:5 to 50:50 by weight, and (2) the difference in ethylene content between the hydrolyzed copolymer $A_1$ and the hydrolyzed copolymer $A_2$ being at least 3% by mole. When the proportion of the hydrolyzed copolymer $A_2$ is too small as compared with the hydrolyzed copolymer $A_1$, the uniformity in film thickness at the time of melt-molding or dimensional stability of molded articles becomes bad and fish eye is not reduced. Also, when the ethylene content of the hydrolyzed copolymer $A_1$ approaches too closely that of the hydrolyzed copolymer $A_2$, the uniformity in film thickness or dimensional stability of molded articles becomes bad, and fish eye is not reduced.

In the present invention, two or more kinds of hydrolyzed ethylene-vinyl acetate copolymers having different ethylene contents are melt-blended and molded into pellet, film, sheet, vessel, fiber, rod, tube or other shaped articles. A pulverized material obtained from articles in the form as mentioned above or the pellet can be availably melt-molded. Usual known melt-blending manners are adoptable in the present invention, e.g. an extrusion molding such as T-die extrusion, inflation molding, blow molding or melt spinning and an injection molding. The melt-blending temperature is usually selected from 170° to 270° C. The injection molding as adopted in the invention includes two-color injection molding and injection blow molding as well as common injection molding, and is particularly useful for production of large-sized articles, e.g. articles of more than 200 g. in injection output or thick articles, e.g. articles having a thickness of more than 5 mm., since the injection pressure is stabilized and the obtained articles have a good dimensional stability.

The composition of the present invention may contain conventional additives, e.g. plasticizer such as a polyhydric alcohol, stabilizer, surface active agent, crosslinkable material such as an epoxy compound, a polyvalent metal salt or an organic or inorganic polybasic acid and its salt, filler, coloring agent, and fiber as a reinforcement such as glass fiber or carbon fiber. Also, other thermoplastic resins may be incorporated into the composition of the present invention. The thermoplastic resins as used in the present invention include, for instance, polyolefin such as low, middle or high density polyethylene, isotactic polypropylene, ethylene-propylene copolymer, ethylene-propylene-diene copolymer, copolymer of ethylene and α-olefin having at least 4 carbon atoms, ethylene-vinyl acetate copolymer, hydrolyzed ethylene-vinyl acetate copolymer having an ethylene content of at least 60% by mole, ethylene-acrylate copolymer, ionomer, polybutene or polypentene, modified polyolefin in which an unsaturated carboxylic acid or its derivative is grafted on the above-mentioned polyolefin, polyamide such as 6 Nylon, 66 Nylon, 10 Nylon, 11 Nylon, 12 Nylon, 6-66 Nylon or 6-10 Nylon, polyvinyl chloride, polyvinylidene chloride, polyester, polyester elastomer, polystyrene, polyacrylonitrile, polyurethane, polyacetal, melt-moldable polyvinyl alcohol, synthetic rubber, and the like. When a mixture of hydrolyzed ethylene-vinyl acetate copolymers is blended with other thermoplastic resins, the ratio of the mixture to the other thermoplastic resins is selected from 99:1 to 50:50 by weight, preferably 97:3 to 70:30 by weight.

In case of adopting extrusion molding as a melt-blending process, it is possible to conduct coextrusion in which a mixture of at least two hydrolyzed ethylene-vinyl acetate copolymers according to the present invention and other thermoplastic resin as mentioned above are molten individually and are extruded so as to contact with each other inside or outside a die. In that case, the laminated film so obtained as a more stabilized oxygen impermeability as compared with a conventional laminated film using one kind of a hydrolyzed ethylene-vinyl acetate copolymer, because the layer of the composition of the invention is uniform in thickness. Extrusion coating is also possible, and the melt-blended composition of the present invention is extruded on a suitable substrate such as plastic films, metal foils or papers to coat them. As plastic films, there are employed, for instance, films such as cellophane, polypropylene, polyamide and polyester, which may be those uniaxially or biaxially extended or may be those coated with polyvinylidene chloride, or the like on one or both sides, and laminated films.

The melt-blended resin composition of the present invention is more particularly described and explained by means of the following Examples, in which the melt tension is measured by employing a melt tension measurement machine made by Toyo Baldwin Co., Ltd.

EXAMPLE 1

Pellet of the following hydrolyzed ethylene-vinyl acetate copolymer $A_1$ and pellet of the following hydrolyzed ethylene-vinyl acetate copolymer A₂ were mixed in a ratio of 3:2 by weight.

Hydrolyzed copolymer A₁:
  Ethylene content: 31.0% by mole, Degree of hydrolysis in vinyl acetate component: 99.0% by mole, Melting point (peak temperature in fusion curve): 186° C., and Melt tension: 0.35 g. at 206° C.

Hydrolyzed copolymer A₂:
  Ethylene content: 40.5% by mole, Degree of hydrolysis in vinyl acetate component: 99.2% by mole, Melting point (peak temperature in fusion curve): 168° C., and Melt tension: 0.28 g. at 188° C.

The mixture was supplied to an extruder equipped with a T-die, melt-blended and extruded into a film having a thickness of 30μ under the following conditions.

Extruder: Extruder having a diameter of 40 mm.
Screw:
  Full-flighted screw, L/D=25,
  compression ratio=3.5
T-die width: 450 mm.
Extrusion temp.:
  Feed zone 180° C.
  Compression zone 210° C.
  Metering zone 220° C.
  Die 200° C.
Screw speed: 40 r.p.m.
Wind-up speed: 25 m./min.

Figure 2:
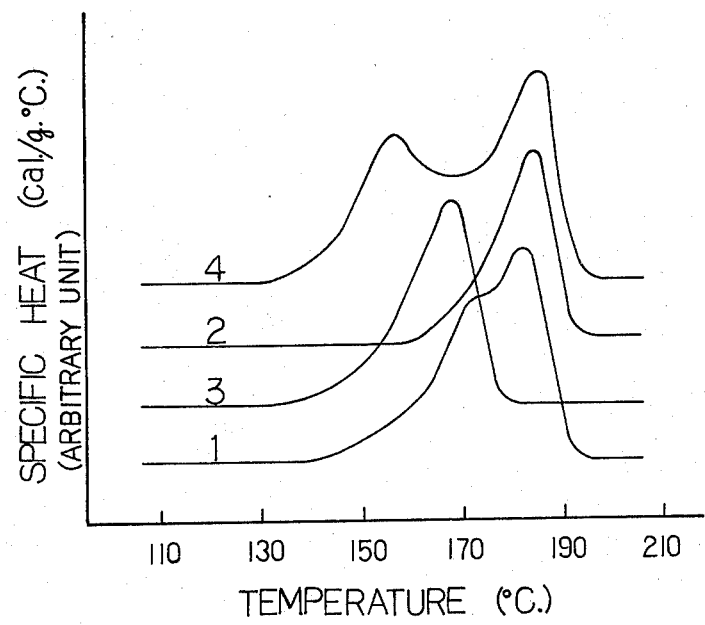
FIG. 2 is a graph showing fusion curves of a composition of the present invention, a hydrolyzed ethylene-vinyl acetate copolymer alone and a comparative composition.

The fusion curve of the obtained film was measured by a Differential Scanning Calorimeter. It showed substantially single peak as shown in FIG. 2, fusion curve 1.

The results are shown in Table 1.

Comparative Examples 1 and 2

The extrusion was carried out under the same conditions as in Example 1 except that the same hydrolyzed ethylene-vinyl acetate copolymer A₁ (Comparative Example 1) or A₂ (Comparative Example 2) as in Example 1 was employed alone.

The results are shown in Table 1.

Comparative Example 3

The extrusion was carried out under the same conditions as in Example 1 except that a hydrolyzed ethylene-vinyl acetate copolymer having an ethylene content of 34.5% by mole, a degree of hydrolysis in vinyl acetate component of 99.1% by mole, melting point (peak temperature in fusion curve) of 182° C. and a melt tension of 0.33 g. at 202° C. was employed alone.

Comparative Example 4

The extrusion was carried out under the same conditions as in Example 1 except that a mixture of the following hydrolyzed ethylene-vinyl acetate copolymers A₁ and A₂ in a ratio of 3:2 by weight was employed.

Hydrolyzed copolymer A₁: The same as the hydrolyzed copolymer A₁ employed in Example 1
Hydrolyzed copolymer A₂: Ethylene content: 40.5% by mole, Degree of hydrolysis in vinyl acetate component: 99.1% by mole, Melting point (peak temperature in fusion curve): 168° C., and Melt tension: 0.07 g. at 188° C.

The results are shown in Table 1.

Comparative Example 5

The extrusion was carried out under the same conditions as in Example 1 except that a mixture of the following hydrolyzed ethylene-vinyl acetate copolymers A₁ and A₂ in a ratio of 3:2 by weight was employed.

Hydrolyzed copolymer A₁:
  The same as the hydrolyzed copolymer A₁ employed in Example 1
Hydrolyzed copolymer A₂:
  Ethylene content: 48.2% by mole, Degree of hydrolysis in vinyl acetate component: 99.0% by mole, Melting point (peak temperature in fusion curve): 153° C., and Melt tension: 0.43 g. at 173° C.

The results are shown in Table 1.

TABLE 1

| | Ex. 1 | Com. Ex. 1 | Com. Ex. 2 | Com. Ex. 3 | Com. Ex. 4 | Com. Ex. 5 |
|---|---|---|---|---|---|---|
| Resin pressure (kg./cm.²) | | | | | | |
| Feed zone | 5 | 5 | 5 | 5 | 5 | 5 |
| Compression zone | 165 | 105 | 80 | 100 | 50 | 50 |
| Metering zone | 185 | 160 | 145 | 155 | 130 | 110 |
| Uniformity in film thickness (%) | 1.4 | 2.6 | 2.9 | 2.6 | 4.6 | 3.5 |
| Number of fish eyes | 4 | 12 | 15 | 13 | 18 | 18 |
| Peak in fusion curve of film | substantially single peak | single peak | single peak | single peak | two independent peaks | two independent peaks |

(Notes)
Number of fish eyes indicates the number of fish eyes having a diameter of at least 0.2 mm. per area of 10 cm. × 10 cm. of a film extruded.

Uniformity in film thickness was calculated according to the following formula on the basis of film thicknesses measured at intervals of 50 cm. extending over 20 m. in the machine direction of the film.

$$\frac{(Maximum\ thickness - Minimum\ thickness) \times \frac{1}{2}}{Average\ thickness} \times 100\ (\%)$$

Fusion curves of films obtained in Example 1 (curve 1), Comparative Example 1 (curve 2), Comparative Example 2 (curve 3) and Comparative Example 5 (curve 4) are shown in FIG. 2.

EXAMPLES 2 TO 4

The procedures of Example 1 were repeated except that mixtures of hydrolyzed ethylene-vinyl acetate copolymers A₁ and A₂ shown in Table 2 were employed and the extrusion temperature was set as follows:

Extrusion temperature in Example 2:
  Feed zone: 190° C.
  Compression zone: 220° C.
  Metering zone: 230° C.
  Die: 210° C.
Extrusion temperature in Examples 3 and 4:
  Feed zone: 180° C.
  Compression zone: 210° C.
  Metering zone: 220° C.

Die: 200° C.
The results are shown in Table 3.

TABLE 2

|  | Example 2 | | Example 3 | | Example 4 | |
| --- | --- | --- | --- | --- | --- | --- |
|  | $A_1$ | $A_2$ | $A_1$ | $A_2$ | $A_1$ | $A_2$ |
| Ethylene content (% by mole) | 25.3 | 37.5 | 31.0 | 37.5 | 37.5 | 31.0 |
| Degree of hydrolysis in vinyl acetate component (% by mole) | 99.3 | 98.7 | 99.0 | 98.7 | 98.7 | 99.0 |
| Melting point (peak temperature in fusion curve) (°C.) | 197 | 172 | 185 | 172 | 172 | 185 |
| Melt tension at a temperature higher than melting point by 20° C. (g.) | 0.56 | 0.32 | 0.35 | 0.30 | 0.30 | 0.35 |
| Weight ratio of $A_1$ to $A_2$ | 1:1 | | 6:1 | | 6:1 | |

TABLE 3

|  | Ex. 2 | Ex. 3 | Ex. 4 |
| --- | --- | --- | --- |
| Resin pressure (kg./cm.$^2$) | | | |
| Feed zone | 7 | 5 | 5 |
| Compression zone | 170 | 155 | 145 |
| Metering zone | 190 | 180 | 170 |
| Uniformity in film thickness (%) | 1.2 | 1.3 | 1.5 |
| Number of fish eyes | 3 | 4 | 6 |
| Peak in fusion curve of film | substantially single peak | single peak | single peak |

EXAMPLE 5

Powders of the following hydrolyzed ethylene-vinyl acetate copolymers $A_1$, $A_2$ and $A_3$ were mixed in a ratio of 3:1:1 by weight by a Henschel mixer.

|  | $A_1$ | $A_2$ | $A_3$ |
| --- | --- | --- | --- |
| Ethylene content (% by mole) | 33.6 | 25.3 | 40.5 |
| Degree of hydrolysis in vinyl acetate component (% by mole) | 98.3 | 99.3 | 99.2 |
| Melting point (peak temperature in fusion curve)(°C.) | 181 | 197 | 168 |
| Melt tension (g.) | 0.31 (at 201° C.) | 0.56 (at 217° C.) | 0.28 (at 188° C.) |

The mixture was supplied to an extruder, melt-blended and extruded from a T-die into a film having a thickness of 25μ under the same extrusion conditions as in Example 1 except that the temperatures in extrusion were 190° C. at feed zone, 220° C. at compression zone, 230° C. at metering zone and 210° C. at die.

The results are as follows:

Resin pressure
 Feed zone: 5 kg./cm$^2$.
 Compression zone: 145 kg./cm$^2$.
 Metering zone: 160 kg./cm$^2$.
Uniformity in film thickness: 1.4%
Number of fish eyes: 5
Peak in fusion curve of film: substantially single peak

EXAMPLE 6 and Comparative Examples 6 and 7

The same pellets of the hydrolyzed ethylene-vinyl acetate copolymers $A_1$ and $A_2$ as in Example 1 were mixed in a ratio of 1:1 by weight. The mixture was supplied to an injection molding machine of 8.3 oz-.avdp. and was molded into a disk having a diameter of 80 mm. and a thickness of 5 mm. under the following injection molding conditions.

Cylinder temperature at front part: 230° C.
Cylinder temperature at rear part: 200° C.
Nozzle temperature: 210° C.
Injection pressure: 1,200 kg./cm$^2$.
Back pressure: 400 kg./cm$^2$.
Injection rate: fast
Injection time: 10 seconds
Cooling time: 30 seconds
Injection cycle: 50 seconds The fusion curve of the obtained molding measured by a Differential Scanning Calorimeter indicated substantially single peak. Also, the size of 50 pieces of the obtained moldings was measured in the directions of the diameter and thickness. The results are shown in Table 4.

Also, the above injection molding was repeated excepting the single use of the hydrolyzed copolymer $A_1$ (Comparative Example 6) or the hydrolyzed copolymer $A_2$ (Comparative Example 7). The results are also shown in Table 4.

TABLE 4

|  | Ex. 6 | Com. Ex. 6 | Com. Ex. 7 |
| --- | --- | --- | --- |
| Size of molding (mm.) | | | |
| Diameter direction | | | |
| Average value | 79.45 | 79.10 | 72.02 |
| Maximum value ($M_1$) | 79.47 | 79.15 | 79.07 |
| Minimum value ($M_2$) | 79.43 | 79.06 | 78.97 |
| $M_1 - M_2$ | 0.04 | 0.09 | 0.10 |
| Thickness direction | | | |
| Average value | 4.92 | 4.88 | 4.87 |
| Maximum value ($M_1$) | 4.93 | 4.90 | 4.90 |
| Minimum value ($M_2$) | 4.91 | 4.86 | 4.85 |
| $M_1 - M_2$ | 0.02 | 0.04 | 0.05 |
| Mold shrinkage Average value in diameter direction | 8/1000 | 11/1000 | 13/1000 |

EXAMPLE 7

A mixture of the same pellets of the hydrolyzed ethylene-vinyl acetate copolymers $A_1$ and $A_2$ as in Example 1 and a pellet of 6-66 Nylon in a ratio of 3:2:1 by weight was supplied to an extruder, and the molding was carried out in the same manner as in Example 1.

The results are as follows:

Resin pressure
 Feed zone: 5 kg./cm$^2$.
 Compression zone: 175 kg./cm$^2$.
 Metering zone: 190 kg./cm$^2$.
Uniformity in film thickness: 1.4%
Number of fish eyes: 5
Peak in fusion curve of film: substantially single peak
 What we claim is:

1. A melt-blended resin composition comprising a mixture of at least two kinds of hydrolyzed ethylene-vinyl acetate copolymers having different ethylene contents, each of the hydrolyzed ethylene-vinyl acetate copolymers having an ethylene content of 20 to 55% by mole, a degree of hydrolysis in vinyl acetate component of at least 80% by mole and a melt tension of at least 0.1 g., the fusion curve of the mixture measured by a Differential Scanning Calorimeter indicating substantially single peak, and the hydrolyzed ethylene-vinyl acetate copolymer $A_1$ included in the largest amount and the hydrolyzed ethylene-vinyl acetate copolymer $A_2$ included in the second largest amount among the hydrolyzed copolymers constituting the composition having the correlation between them that the proportion of the hydrolyzed copolymer $A_1$ to the hydrolyzed copolymer $A_2$ falls within the range of 95:5 to 50:50 by weight and a difference in ethylene content between the hydrolyzed copolymer $A_1$ and the hydrolyzed copolymer $A_2$ is at least 3% by mole.

* * * * *